United States Patent
Perthold

(10) Patent No.: US 8,768,262 B2
(45) Date of Patent: Jul. 1, 2014

(54) METHOD AND DETECTOR FOR DETECTING A POSSIBLE TRANSMISSION OF DATA

(75) Inventor: Rainer Perthold, Weisendorf (DE)

(73) Assignee: Innovationszentrum fuer Telekommunikationstechnik GmbH IZT, Erlangen (DE)

( * ) Notice: Subject to any disclaimer, the term of this patent is extended or adjusted under 35 U.S.C. 154(b) by 0 days.

(21) Appl. No.: 13/246,919

(22) Filed: Sep. 28, 2011

(65) Prior Publication Data

US 2012/0058734 A1 Mar. 8, 2012

Related U.S. Application Data

(63) Continuation of application No. PCT/EP2009/002344, filed on Mar. 31, 2009.

(51) Int. Cl.
*H04B 17/00* (2006.01)

(52) U.S. Cl.
USPC ...................... 455/67.13; 455/67.11

(58) Field of Classification Search
USPC ............................. 455/67.11, 67.13
See application file for complete search history.

(56) References Cited

U.S. PATENT DOCUMENTS

| | | | | |
|---|---|---|---|---|
| 2003/0099286 A1* | 5/2003 | Graziano et al. | ............. | 375/222 |
| 2004/0132410 A1* | 7/2004 | Hundal et al. | ............. | 455/67.13 |
| 2006/0073805 A1* | 4/2006 | Zumkeller et al. | ........... | 455/402 |
| 2006/0105717 A1* | 5/2006 | Kwon et al. | ................ | 455/63.1 |
| 2007/0100922 A1* | 5/2007 | Ashish | .......................... | 708/400 |
| 2008/0016426 A1* | 1/2008 | Li et al. | .......................... | 714/755 |
| 2008/0057869 A1* | 3/2008 | Strong et al. | ................. | 455/63.1 |
| 2008/0112467 A1* | 5/2008 | Shellhammer | ................ | 375/143 |
| 2008/0159203 A1* | 7/2008 | Choi et al. | .................... | 370/328 |
| 2008/0242225 A1* | 10/2008 | Krishnamoorthi et al. | ....... | 455/9 |
| 2009/0103488 A1* | 4/2009 | Zhu et al. | ...................... | 370/330 |
| 2009/0312028 A1* | 12/2009 | Burchfiel | ....................... | 455/450 |
| 2010/0035557 A1* | 2/2010 | Shellhammer | ............. | 455/67.11 |
| 2010/0134699 A1* | 6/2010 | Gao et al. | ...................... | 348/731 |
| 2010/0158171 A1* | 6/2010 | Safavi | ........................... | 375/346 |
| 2011/0081903 A1* | 4/2011 | Cai et al. | ...................... | 455/424 |
| 2011/0129007 A1* | 6/2011 | Schwager et al. | ............ | 375/224 |

FOREIGN PATENT DOCUMENTS

| | | |
|---|---|---|
| GB | 2 112 531 A | 7/1983 |
| WO | 2008/153553 A1 | 12/2008 |

OTHER PUBLICATIONS

Official Communication issued in International Patent Application No. PCT/EP2009/002344, mailed on Sep. 25, 2009.

\* cited by examiner

*Primary Examiner* — Nay A Maung
*Assistant Examiner* — Erica Fleming-Hall
(74) *Attorney, Agent, or Firm* — Keating & Bennett, LLP

(57) ABSTRACT

A detector for detecting a possible transmission of data according to an embodiment of the present invention includes a receiver adapted to the determine a spectral density in the frequency range of an electromagnetic spectrum and an evaluating circuit coupled to the receiver and adapted to determine an effective channel capacity based on the determined spectral density. The evaluating circuit is further adapted to compare the determined effective channel capacity with a threshold value and adapted to generate an evaluation signal indicating a possible presence of the transmission of data based on a result of the comparison.

10 Claims, 3 Drawing Sheets

METHOD AND DETECTOR FOR DETECTING A POSSIBLE TRANSMISSION OF DATA

CROSS-REFERENCE TO RELATED APPLICATIONS

This application is a continuation of copending International Application No. PCT/EP2009/002344, filed Mar. 31, 2009, which is incorporated herein by reference in its entirety.

BACKGROUND OF THE INVENTION

Embodiments according to the present invention relate to a method and a detector for detecting a possible transmission of data, which may, for instance, be employed in the field of counter espionage or to detect a possible presence of a security leak.

In the field of signal intelligence and counter eavesdropping, the challenge exists to distinguish between potentially interesting transmissions and a plurality of legal or unknown signals including drop-in signals or other noise-related or interference transmissions of electronic devices such as personal computers (PC) or the like. Interesting transmissions may, for instance, be initiated by an electronic eavesdropper in his pursuit to gather data illegally or at least against the will of the proprietors of the respective data. Corresponding transmissions may be generated, for instance, by an electronic bug, a surveillance device or other surveillance equipment.

Often, potentially interesting transmissions are detected by evaluating the field strength or intensity of a received transmission. Afterwards, it may be possible to manually evaluate the transmission in terms of its modulation scheme and its content. However, the described method is potentially time-consuming and typically necessitates expert knowledge of the person to carry out the evaluation.

Moreover, software-based automated processes for recognizing the kind of modulation used, demodulating and decoding of the signals exist. These processes and the software-based detection systems, however, are typically limited to certain signals. Such software-based processes typically comprise the drawback that they can only process signals for which they were previously programmed. In other words, in many cases, software-based automated processes are limited to known signals, which may eventually limit the applicability of the processes significantly.

SUMMARY

According to an embodiment, a method for detecting a possible transmission of data may have the steps of: determining a spectral density in a frequency range of an electromagnetic spectrum; determining an effective channel capacity based on the determined spectral density; comparing the determined effective channel capacity with threshold values; and generating an evaluation signal indicating a possible presence of the transmission of data based on a result of the comparison.

According to another embodiment, a detector for detecting a possible transmission of data may have: a receiver adapted to determine a spectral density in a frequency range of an electromagnetic spectrum; and an evaluating circuit coupled to the receiver and adapted to determine an effective channel capacity based on the determined spectral density, adapted to comparing the determined effective channel capacity with a threshold value and adapted to generate an evaluation signal indicating a presence of the possible transmission of data based on the result of comparison.

Another embodiment may have a computer program for performing, when running on a processor the inventive method for detecting a possible transmission of data.

An embodiment according to the present invention in the form of a method for detecting a possible transmission of data comprises determining a spectral density in a frequency range of an electromagnetic spectrum, determining an effective channel capacity based on the determined spectral density, comparing the determined effective channel capacity with a threshold value and generating an evaluation signal indicating a possible presence of the transmission of data based on the result of the comparison.

An embodiment according to the present invention in the form of a detector for detecting a possible transmission of data comprises a receiver adapted to determine a spectral density in the frequency range in an electromagnetic spectrum and an evaluation circuit coupled to the receiver and adapted to determine an effective channel capacity based on the determined spectral density, adapted to comparing the determined effective channel capacity with a threshold value and adapted to generate an evaluation signal indicating a presence of the possible transmission of data based on a result of the comparison.

Embodiments according to the present invention are based on the finding that a faster and more flexible detection of a possible transmission of data is possible by determining the overall energy emitted by a possible transmitter or at least a part thereof and to determine as to whether the emitted energy corresponds to a channel with a channel capacity being sufficiently high to facilitate the possible transmission of data. In other words, embodiments according to the present invention are based on the finding that it is possible to detect a possible transmission of data or a presence of a sender capable of transmitting the data by monitoring the spectral density, deriving an effective channel capacity based thereon and by comparing the derived effective channel capacity with a threshold value indicative of a specific type of transmission.

In embodiments according to the present invention determining the effective channel capacity may be based on utilizing a signal-to-noise-ratio (SNR). In further embodiments of the present invention, the signal-to-noise-ratio may be estimated or determined by taking further attenuation-related or noise-related parameters or effects into account.

Embodiments of the present invention may be used for different kinds of transmissions including radio transmissions, but also cable-bound transmissions. Depending on implementation of details, embodiments according to the present invention may be used with both, modulation-based transmission schemes and direct transmission schemes.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
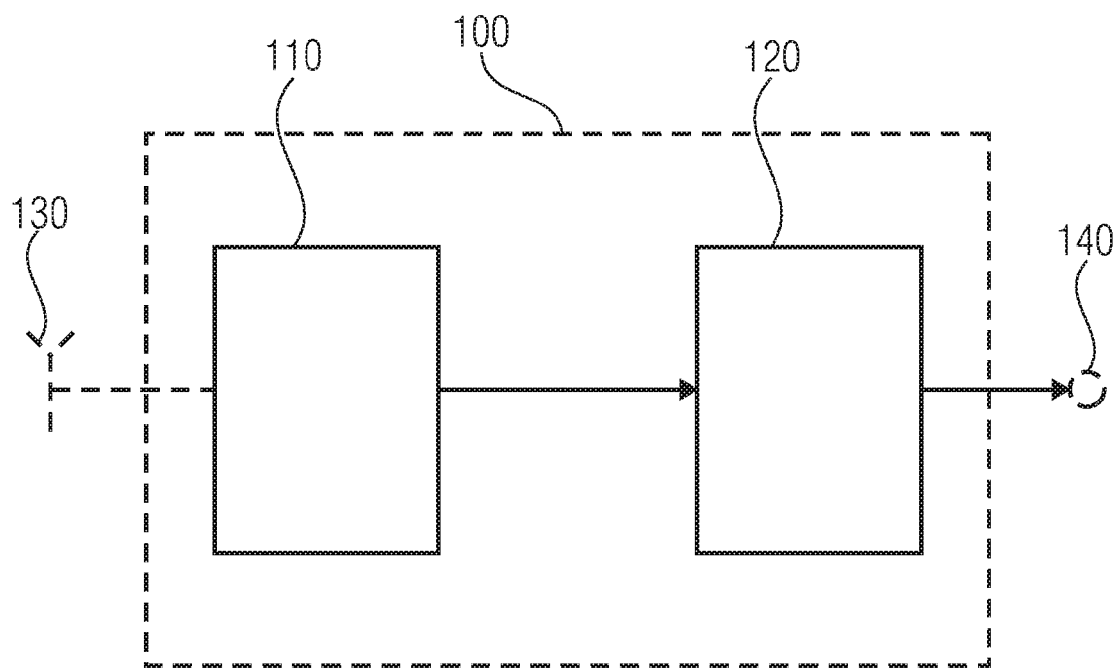
FIG. 1 shows a block diagram of a detector according to an embodiment of the present invention.
Figure 2:
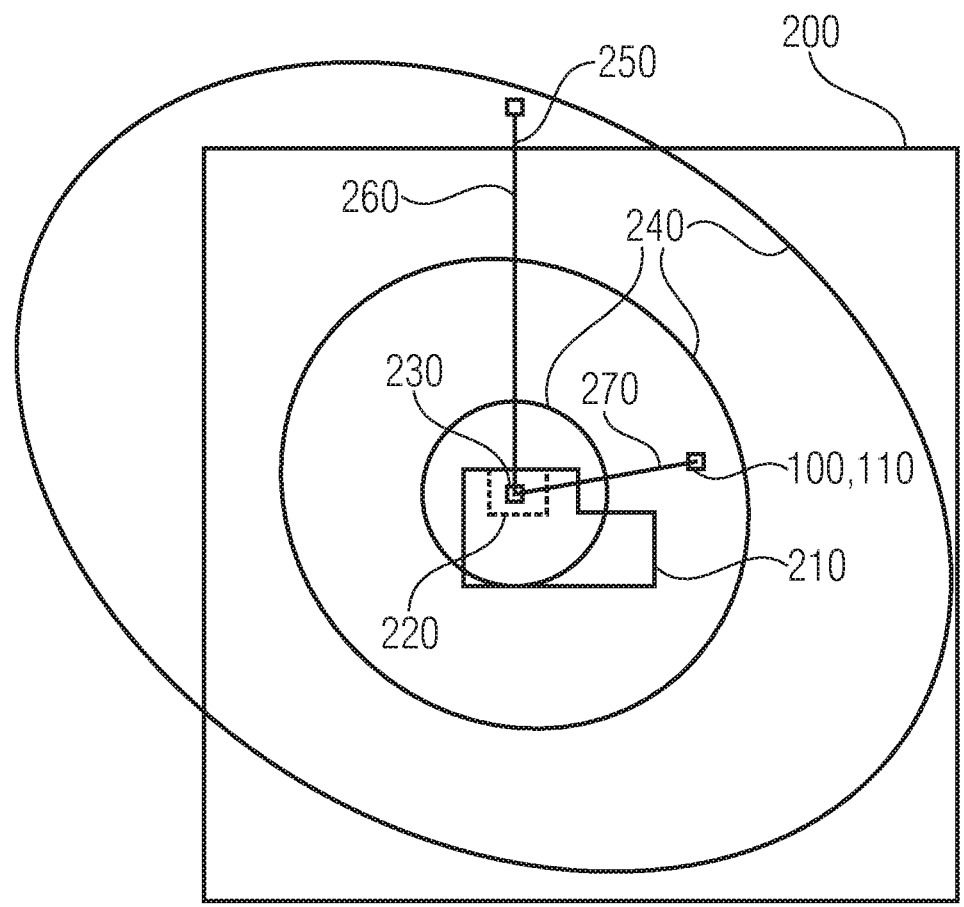
FIG. 2 illustrates a possible application scenario for an embodiment according to the present invention.
Figure 3:
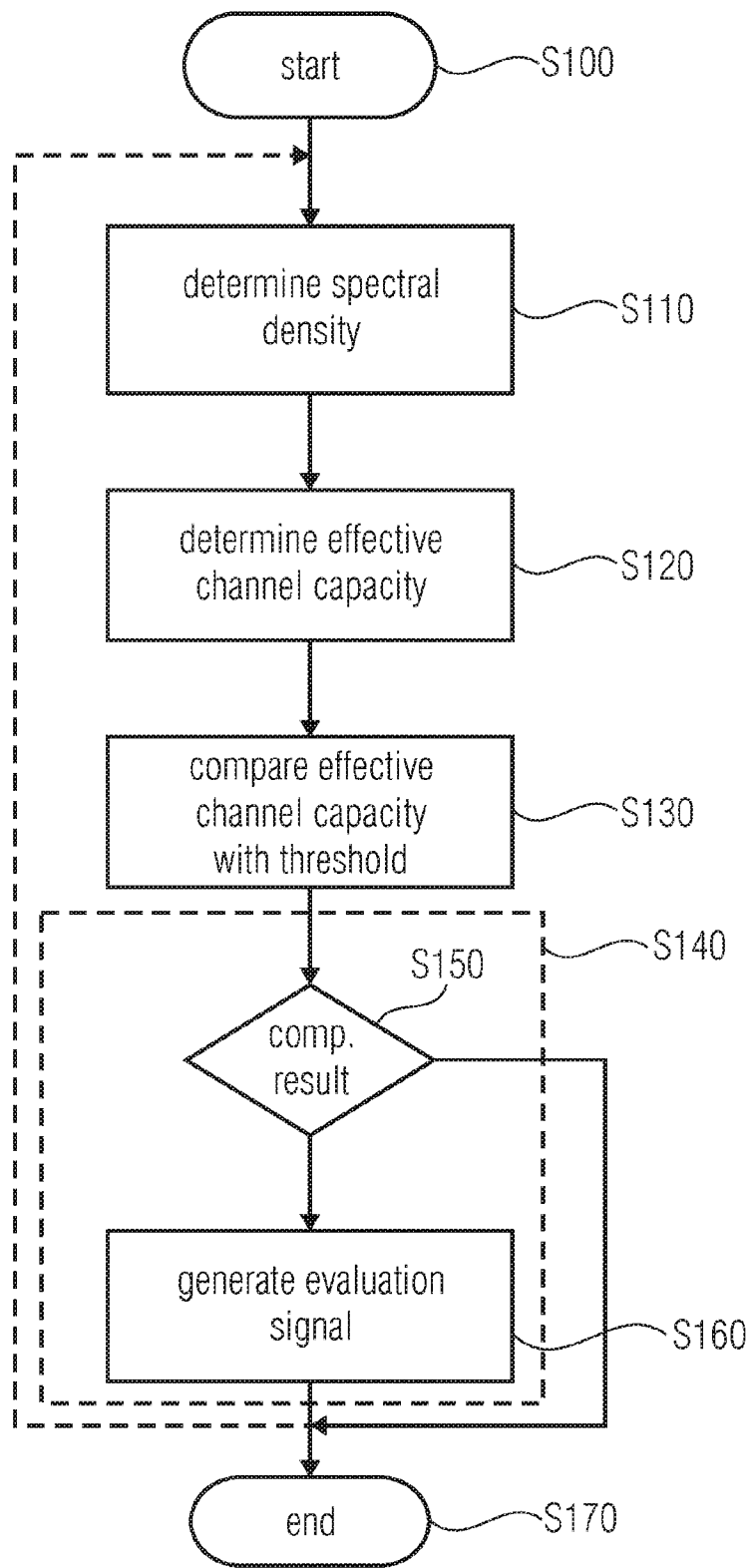
FIG. 3 shows a flow diagram of a method for detecting a possible transmission of data according to an embodiment of the present invention.

With reference to FIGS. 1 to 3 in the following, embodiments of the present invention will be described in more detail. However, before starting with the description of a detector according to an embodiment of the present invention, it should be noted that the methods and detectors described herein may be used for different kinds of transmissions including radio transmissions, cable-bound transmissions or other types of transmissions. Moreover, depending on the actual kind of transmission used, embodiments according to the present invention may be used for modulation-based transmission schemes as well as direct transmission schemes. Only for the sake of simplicity, in the following, a main focus will be laid on modulated radio transmissions.

FIG. 1 illustrates a block diagram of the detector 100 comprising a receiver 110 and an evaluation circuit 120. As an optional component, the detector is coupled to an antenna 130 via which the receiver 110 is capable and adapted to determine a spectral density in the frequency range of an electromagnetic spectrum received by the antenna 130. The receiver 110 provides information concerning the spectral density to the evaluation circuit 120, which then performs a determination of an effective channel capacity based on the spectral density, compares the determined effective channel capacity with a threshold value and generates an evaluation signal indicating a possible presence of a possible transmission of data based on the result of the comparison. To provide the evaluation signal, the evaluation circuit 120 may be coupled to an optional output 140, which may be the output of the evaluation circuit 120 and/or that of the detector 100 itself.

In other words, the receiver 110 is adapted to receive or to determine the spectral density, while in many embodiments according to the present invention the evaluation circuit 120 performs the further process steps, which will be outlined in more detail below.

It should be noted that various changes with respect to the detector 100 may be implemented according to embodiments of the present invention. For instance, in case of a non-radio transmission to be detected, the antenna 130 may be substituted by another appropriate receiving element, such as an input in the form of a coupler, a satellite dish or any other suitable component, wherein it should be noted that a satellite dish is also an antenna. Furthermore, the output 140 may eventually be omitted in case the evaluation circuit 120 further comprises additional circuits or components to further process the evaluation signal.

All the previously mentioned receiving elements, including the depicted antenna 130 of FIG. 1, may equally well be included in the receiver 110 itself, depending on the concrete circumstances of the implementation. For instance, in the case of a detector 100 for radio-based transmissions, the antenna may be formed by components directly integrated into the detector 100 or the receiver 110. However, as outlined before, the antenna 130 may eventually be omitted in case of cable-bound transmissions to be monitored.

The receiver 110 itself should be adapted to the kind of possible transmissions of data to be expected. For instance, in the case of radio-based detectors 100, the receiver 110 may comprise of or be formed by a spectrum analyzer, a tunable radio receiver, a Fourier-based receiver (e.g. based on a FFT-technique (FFT=Fast Fourier Transform)) or any other suitable receiver adapted to provide a spectral density with respect to a frequency range. Depending on the technique used, the spectral resolution of the spectral density may be referred to as frequency bins in the case of Fourier-based receivers, filter bandwidths in the case of bandpass filter-based receivers or resolution bandwidths in the case of network analyzers or spectrum analyzers. For the sake of simplicity only, in the following a receiver 110 based on a spectrum analyzer will be assumed. Accordingly, the resolution of the spectral density will be referred to as the resolution bandwidth.

To describe a possible application of a detector 100 or a method for detecting a possible transmission of data according to an embodiment of the present invention in more detail, FIG. 2 illustrates a schematic representation of a works premises 200 including a building 210. Inside the building 210 a room 220 is located, which may for instance be a laboratory, a conference room, an office or another attractive target for industrial espionage, in which a bug or another surveillance device 230 is located.

The surveillance device 230 records data of interest for an eavesdropper such as audio data, video data, computer data or the like. In the threat scenario depicted in FIG. 2, the surveillance device 230 broadcasts signals or transmissions in a non-directional fashion indicated by a sequence of three circles 240.

Since the eavesdropper is typically not capable of accessing a safe spot inside the premises 200, the eavesdropper is typically forced to locate a hostile receiver 250 just outside the works premises 200 to receive the transmissions of a surveillance device 230. Hence, the receiver 250 of the potential adversary is located at a first distance 260 from the surveillance device 230. In other words, the threat scenario depicted in FIG. 2 is based on the assumption that a potential adversary receives the transmissions from the surveillance device 230 via a receiver 250, which will also be referred to as receiver RX1.

To counteract such attempts of signal intelligence or electronic eavesdropping, a detector 100 according to an embodiment of the present invention may be used. To enable such a counter-intelligence, the detector 100 or at least a receiver 110 of the detector 100 is located in the vicinity of a potential target of electronic eavesdropping. As a consequence, in case of a uniform or at least partially non-directed transmission of data by the surveillance device 230, the detector 100 or the receiver 110 will most probably also receive the transmissions of a surveillance device 230. However, since in most cases the detector 100 or the receiver 110 will be located inside the works premises 200, the detector 100 or the receiver 110 will be arranged at a different, second distance 270 from the surveillance device 230.

In many cases, the most important challenge is to detect possible transmissions of data and to decide as to whether an illegal surveillance device 230 may be present on the premises 200 or in the building 210. The situation is complicated by the fact that typically the interesting radio or other transmissions are superposed by a plurality of legal, wanted or at least known and accepted signals and transmissions including disturbances and noise, as, for instance, emitted by electronic devices operating at sufficiently high frequencies.

Examples for such at least known transmissions are transmissions caused by computers (e.g. personal computers, PC). Moreover, since radio transmissions become more popular for communicating between computers and other systems (e.g. bluetooth® or WLAN networks) the challenge of detecting unauthorized transmissions becomes more difficult.

Furthermore, the eavesdropper may try to hide his activity by using modulation schemes (in the case of radio transmissions), coding schemes and further parameters, which may be suitable to hide transmissions. Hence, signal intelligence should start from the assumption that a priori nothing is known concerning the modulation scheme, the coding scheme or similar properties and parameters of the transmissions, which are used by a possibly present surveillance device 230.

As will be outlined below, embodiments according to the present invention in the form of a detector 100 or in the form of a method for detecting a possible transmission of data may allow to exclude a significant part of transmissions based on a plausibility assessment, so that the respective transmissions may be excluded from difficult and time-consuming further assessments.

The only information necessitated are information concerning a spectral density in a frequency range received by the receiver 110 or the detector 100 which is under the control of the user of the detector 100. The detector 100 as well as an application of a method for detecting a possible transmission of data may, hence, allow an evaluation of the transmissions or radio signals based on a received spectral density.

The method for detecting a possible transmission of data according to an embodiment of the present invention will be described with respect to a flow diagram shown in FIG. 3. After the start of the method in step S100, in a step S110 a spectral density in a frequency range is determined. Step S110 may, as outlined above, be performed by the receiver 110 shown in FIG. 1.

Afterwards, in step S120, an effective channel capacity is determined, which may be carried out by the evaluation circuit 120 of the detector 100 as shown in FIG. 1. In a following step S130, the effective channel capacity is compared with a threshold value. As outlined above, this may also be performed by the evaluation circuit 120.

In a subsequent step S140, based on the comparison result of the comparison in step S130, an evaluation signal may be generated, if, for instance, the comparison result indicates the presence of a potentially unwanted transmission of data. In other words, in a step S150 a decision based on the comparison result may be taken as to whether the evaluation signal is to be generated in a step S160.

However, in different embodiments according to the present invention, the evaluation signal may equally well be generated in such a way that the evaluation signal itself is indicative as to whether a possible transmission of data is present in the frequency range or not. In such a case, step S150 of deciding whether to generate the evaluation signal or not may eventually be omitted.

The method may end in step S170 or may, optionally, equally well be restarted by jumping back to step S110. As a consequence, a method may be performed repeatedly such that a sequence of evaluation signals indicating the possible presence of a possible transmission data over time may be obtainable.

The described method for detecting a possible transmission of data is based on the fact that an eavesdropper is typically interested in a specific content of signals or transmissions. In other words, typically, the eavesdropper is interested in the data transmitted by the corresponding signals. The data may be, for instance, audio data, video data, computer data or other valuable data. For many different kinds of data a minimum quality of a transmission may be safely assumed such that a minimum necessitated data rate $C_{min}$ may be estimated below which a transmission may not be useful and may, hence, be considered improbable.

By using the receiver 110, which is in the following also referred to as receiver RX2, in step S110 the spectral density $S_{RX2}$ of a possible transmission of data is received and determined. The spectral density of the signal or transmission itself is typically indirectly determined by simultaneously measuring the sum of the spectral density of the signal itself $S_{RX2}$ and the base noise density $N_{0,2}$ and by subtracting or otherwise taking the known base noise density $N_{0,2}$ into account.

Based on the measured or determined spectral density of a signal $S_{RX2}$ an expected signal-to-noise-ratio $SNR_1$ may be estimated on the basis of which by applying with Shannon-Hartley theorem, the theoretical upper boundary of a maximum data rate C may be determined. With the estimated signal-to-noise-ratio $SNR_1$ and as a function of the frequency f, the channel capacity C in bits per second (bit/s) may be obtained based on the equation $$C = \int_{f_r} \log_2(1 + SNR_1(f)) df, \quad (1)$$

wherein the integration is carried out over the frequency range f and wherein $\log_2(\ldots)$ indicates the logarithm with respect to the basis of 2. In case the signal-to-noise-ration $SNR_1(f)$ is much larger than 1, equation (1) may be, for instance, approximated by $$C = \int_{f_r} \log_2(SNR_1(f)) df. \quad (1a)$$

In step S130 the determined channel capacity C may be compared with the threshold value $C_{min}$, which is chosen such that the signal having a general capacity $C_{min}$ is most probably not considered to be a threat. In case the determined channel capacity C is larger than the threshold value $C_{min}$, a more precise evaluation may be carried out manually or automatically, which may be triggered by the generated evaluation signal (step S140).

The previously described embodiments according to the present invention in the form of a method for detecting a possible transmission of data, which may, for instance, be carried out by the evaluation circuit 120, in terms of determining the effective channel capacity based on the determined spectral density may be enhanced or improved by taking further assumptions or estimation into account, which may depend on actual measurements of a respective data or may be provided by a user based on numerical, theoretical or experience-based estimations. However, it should be noted that none of the following assumptions are necessitated for embodiments according to the present invention to be implemented. They may, however, improve the result by reducing the number of erroneous or false alarms.

The user of the detector 100 or the method according to an embodiment of the present invention may formulate assumptions concerning the base noise of the receiver 250 of the eavesdropper $N_{0,1}$ compared to that of the receiver 110 or the detector 100 of the user ($N_{0,2}$), for instance, in units dBm/Hz which may for instance depend on the difference between the distances 260, 270 between the possibly present surveillance device 230 and the two receivers 110, 250, respectively. The estimation of the base noise of the receiver of a possible eavesdropper may furthermore be influenced by assumptions concerning the available equipment. For instance, depending on the frequency range involved. As an example, bulky antennas capable of providing a low noise floor, may eventually not be used by the eavesdropper due to being easily spotted.

Furthermore, additional efforts to attenuate possible transmissions from the surveillance device 230 may be used, which may lead to an elevation of the noise floor or a reduction of the signal strength. For instance, applying a metallic or otherwise radio frequency-blocking coating to windows to block or attenuate radio frequencies may reduce the chances of a successful eavesdropping attack.

A very closely related parameter is the path attenuation $a_{12}$ or, to be more precise, differences concerning the path attenuations between the path from the surveillance device 230 to the receiver 110 of the detector 100 on the one hand and to the receiver 250 of the eavesdropper on the other hand. The difference between the path attenuations including different antenna gains with respect to the sender of the surveillance device 230 and the two receivers 110, 250 may be expressed in terms of dB. In the equations below a positive value may be interpreted such that the signal received by the receiver 110 (RX2) of the detector 100 is stronger than that received by the receiver 250 (RX1). Also this value may be influenced by the different distances 260, 270 by the surveillance device 230 and the two receivers 110, 250 involved. Furthermore, additional precaution measures such as the previously mentioned coating of the windows, jamming signals or other counter measures may also influence the estimation of the path attenuation $a_{12}$.

Typical values for the noise floors $N_{0,1}$ and $N_{0,2}$ being integrated over the corresponding frequency range may have values in the range between −174 dBm/Hz up to −134 dBm/Hz with a typical value of approximately −160 dBm/Hz. Also, values of the path attenuation $a_{12}$ may have values in the same range with a similar typical value of approximately 20 dB.

A further parameter which may lead to an improvement of the detection quality of the presence of possible transmissions, is closely related to the maximum number of symbols to be transmitted by an expected or a likely modulation scheme. The number of different symbols, which is also closely interrelated with a symbol separation of a respective modulation scheme, typically results in a maximum usable signal-to-noise-ratio $SNR_{max}$, which may also be expressed in dB. For instance, for a QAM-64 modulation scheme (QAM=quadrature amplitude modulation) with the ability of encoding 64 (=8×8) symbols, the maximum usable signal-to-noise-ratio $SNR_{max}$ is in the range of 30 dB. The QAM-64 modulation scheme may be an attractive modulation scheme for using in context with electronic bugs or WLAN-related implementations of surveillance devices 230 (WLAN=wireless local area network). However, also different modulation schemes may be used. For instance, different QAM modulation schemes may be employed, such as QAM-1024 modulation scheme, which is frequently used in radio relay systems or directional radio systems. However, since the QAM-1024 modulation scheme is capable of distinguishing between 1024 (=32×32) individual symbols, a signal-to-noise-ratio $SNR_{max}$ to be used in context with a QAM-1024 modulation scheme typically necessitates a significantly higher value in the range of at least 40-50 dB, although QAM-1024 may be successfully operated with a signal-to-noise-ratio of at least 36 dB. Taking the typical application boundary conditions of surveillance devices into account, the QAM-1024 modulation scheme may be more unlikely to encounter due to the signal quality restrains.

Naturally, also different modulation schemes, such as the QAM-4, the QPSK (quadrature phaseshift keying) or the Π/4-QPSK may equally well be used. These modulation schemes may yield a lower maximum signal-to-noise-ratio $SNR_{max}$ of about 10 dB to 20 dB.

A further parameter, which may be used in the framework of the detector 100 and the method for detecting possible transmissions of data according to an embodiment of the present invention and which may lead to a more robust and less error-prone implementation thereof, is a parameter indicative of a capacity of a channel coding $d_{FEC}$. The capacity $d_{FEC}$ of the channel coding is a parameter characterizing the capabilities of the employed channel coding scheme over the transmission path in view of the same transmission path, but assuming a perfect channel coding. The parameter $d_{FEC}$ typically assumes values in the range between 0 dB to 20 dB or more for no channel coding at all.

In other words, the capacity of a channel coding represents a deviation from the theoretically achievable Shannon or Shannon-Hartley limit. For instance, in the case of LDPC modulation (Low Density Parity Check), the parameter $d_{FEC}$ is often in the range of 0 to 3 dB, while using a Hamming coding may yield $d_{FEC}$-values of approximately 3 dB and convolution-based codes of approximately 3 dB to 5 dB.

A further parameter, which may be used to eventually improve the detecting quality is a proper definition of the frequency range on the basis of which the spectral density is determined. In the following equations the frequency range will be indicated by f-r, which may, for instance, be expressed in terms of a lower border frequency $f_{min}$ and an upper border frequency $f_{max}$. As with all the parameters discussed above, these parameters may equally well be determined by a user or may automatically be adjusted according to the detected spectral density or on the basis of other criteria.

Although for the different parameters above, typical values and ranges were given in dB and are hence expressed on a logarithmic scale, in the following the parameters will be used mainly on a linear scale. The logarithmic parameters and the linear parameters are interconnected via the expression $$X_{log} = 10 \cdot \log_{10}(X), \qquad (2)$$

wherein X is a parameter on the linear scale, $X_{log}$ is the logarithmic version thereof, typically in units of dB, and $\log_{10}$ ( . . . ) is the logarithm to the basis 10. In other words, the logarithmic versions of the parameters are indicated by an additional index "log".

As outlined above, by using the receiver 110 (RX2) of a detector 100 in a first step (S110) the spectral density $S_{RX2}$ of the signal, which may be generated by the surveillance device 230 is determined. Typically, this is done by indirectly measuring the sum of the spectral density $S_{RX2}$ and the base noise density $N_{0,2}$ and to correct the measured sum by taking the base noise density $N_{0,2}$ accordingly into account.

Then, from the measured spectral density of the signal $S_{RX2}$ the spectral density of the signal received by the eavesdropper receiver 250 (RX1) may be estimated according to $$S_{RX1} = \frac{S_{RX2}}{a_{12}}. \qquad (3)$$

When using the logarithmic equations, the estimated spectral density received by the eavesdropper's receiver 250 becomes $$S_{RX1,log} = S_{RX2,log} - a_{12,log}. \qquad (4)$$

Based on the estimated spectral density $S_{RX1}$, an expected signal-to-noise-ratio $SNR_1$ may be obtained according to $$SNR_1 = \frac{S_{RX1}}{A}, \qquad (5)$$

wherein A is an attenuation function or attenuation parameter, which may be given according to $$A = N_{0,1} \cdot d_{FEC}. \qquad (6)$$

When using the logarithmic versions of the parameters, a combination of equations (5) and (6) yields $$SNR_{1,log} = S_{RXX,log} - N_{0,1,log} - d_{FEC,log}, \qquad (7)$$

reflecting the estimated usable signal-to-noise-ratio for the eavesdropper in dB.

Based on the determined signal-to-noise-ratio $SNR_1$ a theoretical maximum attainable data rate exists, which may be transmitted in this channel based on the assumption that white Gaussian noise is present. The theoretical maximum data rate C is the so-called Shannon capacity given in units of bits per second (bit/s) according to the Shannon-Hartley relation (1). In case the frequency range f-r is a continuous frequency range beginning at the minimum border frequency $f_{min}$ and ending at the maximum border frequency $f_{max}$, equation (1) becomes $$C = \int_{f_{min}}^{f_{max}} \log_2(1 + SNR_1(f))df. \quad (8)$$

Similarly, approximation equation (1a) becomes $$C = \int_{f_{min}}^{f_{max}} \log_2(SNR_1(f))df. \quad (8a)$$

As outlined above, in case the determined effective channel capacity C according to any of the equations (1) or (8) is below a minimum value $C_{min}$, it may be assumed that the signal received does not represent a threat. However, in case the determined maximum data rate C is higher than the minimum threshold value $C_{min}$, the detector 100 provides an evaluation signal, on the basis of which further investigations may follow, which may be performed manually, automatically or in a combined way using both, manual and automated techniques.

For instance, assuming a total signal bandwidth of 10 Hz and a signal-to-noise-ratio of 30 dB yields a channel capacity C of approximately 100 bit/s, which is for many data transmissions a very low value and may probably be disregarded as a consequence.

Depending on the threat scenario and the data transmissions expected, the threshold value $C_{min}$ may vary accordingly. For instance, for an expected transmission of audio data, a minimum threshold value for the data rate of approximately 30 kbit/s may be a used as a exemplary value, while a video transmission may eventually necessitate higher data rates, such as 64 kbit/s or above. However, also lower or higher values may be employed, depending on the probability that the eavesdropper uses complex audio or video encoding schemes to reduce the data rate below the above-given example values. However, also the values given above do not form requirements. Depending on the data rates accessible with modern audio and/or video codecs and taking the desired quality into account, lower values may be advisable to choose.

In case very high and, in terms of the frequencies involved, narrow transmissions could in principle enable very high data rates according to the Shannon-Hartley relation (cf. equations (1) and (8)), however, carrier waves with a Dirac-like frequency distribution do not carry information. Therefore, it may be advisable to limit the estimated signal-to-noise-ratio $SNR_1$ in such a case to not obtain artificially high data rates and to prevent, hence, false alarms.

As outlined above, this may be achieved by taking the symbol separation of the modulation scheme involved into account by defining the maximum usable signal-to-noise-ration $SNR_{max}$. In this case, the signal-noise-ratio $SNR_1$ as defined in equations (5), (7) may be altered by limiting the estimated signal-to-noise ratios to the $SNR_{max}$-value. This may be achieved by replacing equations (5) or (7) by the equations $$SNR_1 = \min\left(\frac{S_{RX1}}{A}; SNR_{max}\right) \quad (9)$$

and $$SNR_{1,log} = \min(S_{RX1,log} - N_{0,1,log} - d_{FEC,log}; SNR_{max,log}), \quad (10)$$

respectively.

It may be beneficial for some embodiments according to the present invention, when determining the spectral densities as provided to evaluation circuit 120 is done with a large resolution bandwidth, although during the actual determination of a spectral density very small resolution bandwidths (e.g. 1 Hz) may be used. As a consequence, by using the parameter $SNR_{max}$ and the limitation of the estimated signal-to-noise-ratio according to equations (9) or (10), unmodulated signals or signal parts (e.g. carrier signals) may be excluded from the evaluation as to whether an unwanted possible transmission of data is present, since these signals or parts of signals do not carry information.

Moreover, longer measurement times may in some circumstances be favorable, since for an evaluation of a transmission path the average data rate is important, which may deviate from big values in case a possible surveillance device 230 (e.g. temporarily) buffers data.

As outlined before, embodiments according to the present invention may offer the benefits that they can be operated completely independent from the modulation schemes. Moreover, they may exclude narrow-band interference signals very easily, which are often present in the vicinity of modern information technology. Moreover, some embodiments according to the present invention may offer the benefit that the computational effort is compared to the classification of the signal flow.

As indicated earlier, embodiments according to the present invention are by far not necessitated to implement all the details as given above. For instance, not all of the parameters described above are necessitated to be implemented. Furthermore, different kinds of technologies may be used to determine the spectral density. Furthermore, embodiments according to the present invention are by far not limited to radio transmissions. They can easily be applied to cable-bound or other transmissions.

Embodiments according to the present invention may furthermore be implemented on the basis of discrete electronic components, integrated circuits (e.g. ASIC=application specific integrated circuits)) or any combination thereof. Furthermore, embodiments according to the present invention may equally well be implemented based on processors such as a central processing unit (CPU) or a graphical processing unit (GPU).

Depending on certain implementation requirements of embodiments of the present invention, embodiments of the inventive methods can be implemented in hardware or in software. The implementations can be performed using a digital storage medium, for instance, a disc, a CD, a DVD or another digital storage medium having electronically readable control signals stored thereon, which cooperate with a programmable computer or a processor such that an embodiment of the inventive methods is performed. Generally, an embodiment of the present invention is, therefore, a computer program product, wherein the program code is stored on a machine-readable carrier and the program code is operative to perform an embodiment of the inventive methods, when the computer program product runs on the computer or the processor. In other words, embodiments of the inventive methods are, therefore, a computer program having a program code for performing at least one of the embodiments of the inventive methods, when the computer program runs on the computer or the processor. A processor can be formed by a computer, a chip card, a smart card, an application-specific integrated circuit (ASIC), a central processing unit (CPU), a graphical processing unit (GPU) or an integrated circuit (IC).

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for detecting a possible transmission of data representing a threat, comprising:
   determining a spectral density in a frequency range of an electromagnetic spectrum of a signal received at a first location;
   determining a theoretical upper boundary of a channel capacity based on the determined spectral density;
   comparing the determined theoretical upper boundary with a threshold value; and
   if the determined theoretical upper boundary is below the threshold value, determining that the received signal does not represent a threat, and, if the determined theoretical upper boundary is above the threshold value, generating an evaluation signal indicating a possible presence of the transmission of data representing a threat; wherein
   determining the theoretical upper boundary of a channel capacity comprises estimating a signal-to-noise ratio based on the determined spectral density and a difference of a path attenuation between a path from an assumed transmitter to the first location and a path from the assumed transmitter to the second location of a possible hostile receiver.

2. The method according to claim 1, wherein determining the theoretical upper boundary further comprises determining a theoretical upper boundary C based on $$C = \int_{f-r} \log_2(1 + SNR_1(f)) df$$

or based on $$C = \int_{f-r} \log_2(SNR_1(f)) df,$$

wherein $SNR_1$ is the signal-to-noise-ratio, f-r is a frequency range and f is the frequency.

3. The method according to claim 1, wherein determining the theoretical upper boundary comprises estimating the signal-to-noise-ratio additionally based on at least one of a noise floor of a possible receiver, a maximum usable signal-to-noise-ratio, and a capacity of a channel coding.

4. The method according to claim 1, wherein determining the theoretical upper boundary comprises estimating a signal-to-noise-ratio $SNR_1$ based on $$SNR_1 = \frac{S_{RX1}}{A} \text{ or } SNR_1 = \min\left(\frac{S_{RX1}}{A}; SNR_{max}\right),$$

wherein $S_{RX1}$ is the spectral density determined in the frequency range, A an attenuation function and $SNR_{max}$ a maximum usable signal-to-noise-ratio.

5. The method according to claim 1, wherein determining a spectral density in the frequency range comprises determining the spectral density in a continuous frequency range from a low border frequency to a high border frequency.

6. The method according to claim 1, wherein the threshold value depends on an expected kind of transmission or a kind of data expected to be transmitted.

7. The method according to claim 1, wherein the transmission is a radio transmission.

8. A detector for detecting a possible transmission of data representing a threat, comprising:
   a receiver adapted to determine a spectral density in a frequency range of an electromagnetic spectrum of a signal received at a first location; and
   an evaluating circuit coupled to the receiver, wherein the evaluating circuit is adapted:
   to determine a theoretical upper boundary of a channel capacity based on the determined spectral density,
   to compare the determined effective channel capacity with a threshold value,
   to determine that the received signal does not represent a threat if the determined theoretical upper boundary is below the threshold value, and
   to generate an evaluation signal indicating a presence of the possible transmission of data representing a threat if the determined theoretical upper boundary is above the threshold value; wherein
   determining the theoretical upper boundary of a channel capacity comprises estimating a signal-to-noise ratio based on the determined spectral density and a difference of a path attenuation between a path from an assumed transmitter to the first location and a path from the assumed transmitter to a second location of a possible hostile receiver.

9. The detector according to claim 8, wherein the receiver comprises a spectrum analyzer, a Fourier-based receiver or tunable radio receiver.

10. A non-transitory computer readable medium including a program for performing, when running on a processor, a method for detecting a possible transmission of data representing a threat, the method comprising:
    determining a spectral density in a frequency range of an electromagnetic spectrum of a signal received at a first location;
    determining a theoretical upper boundary of a channel capacity based on the determined spectral density;
    comparing the determined theoretical upper boundary with a threshold value; and
    if the determined theoretical upper boundary is below the threshold value, determining that the received signal does not represent a threat, and, if the determined theoretical upper boundary is above the threshold value, generating an evaluation signal indicating a possible presence of the transmission of data representing a threat; wherein
    determining the theoretical upper boundary of a channel capacity comprises estimating a signal-to-noise ratio based on the determined spectral density and a difference of a path from an assumed transmitter to the first location and a path from the assumed transmitter to a second location of a possible hostile receiver.

* * * * *